Feb. 28, 1933.  M. HANDSCHIEGL  1,899,032
PRODUCTION OF PEDIGREED NEGATIVES
Filed Dec. 27, 1926  2 Sheets—Sheet 1
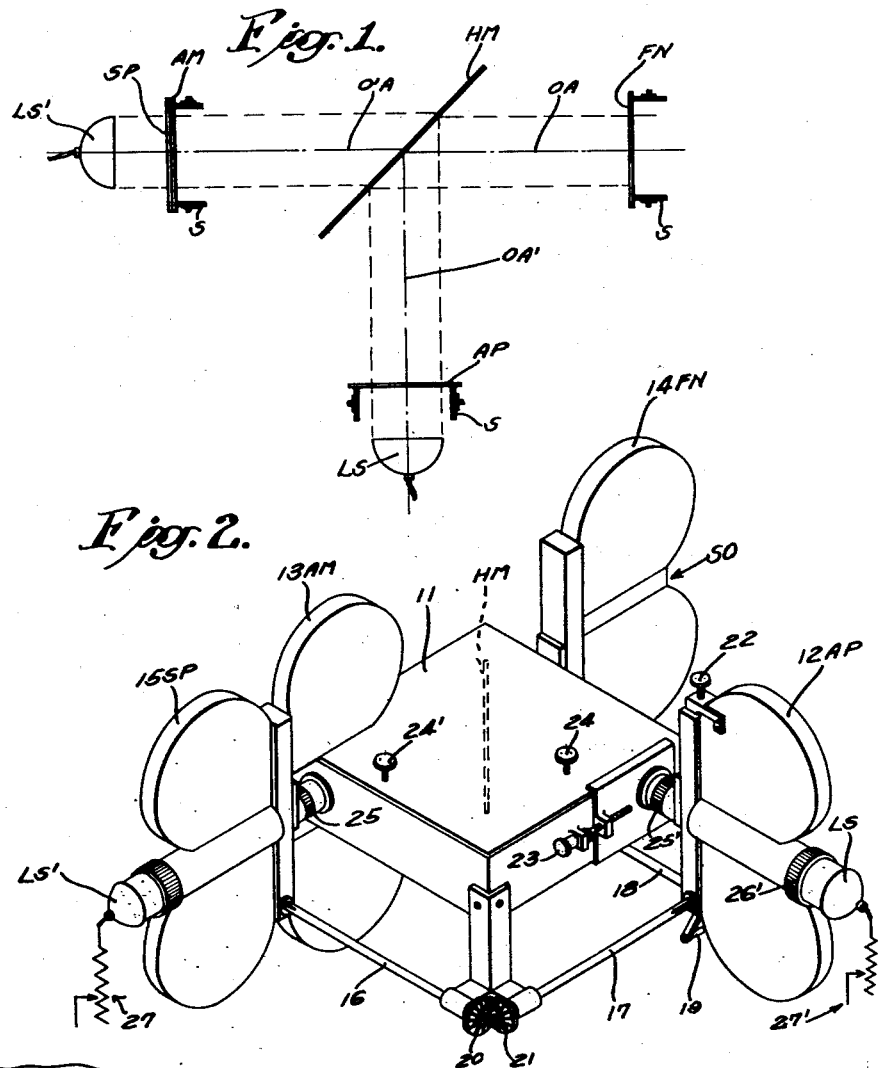
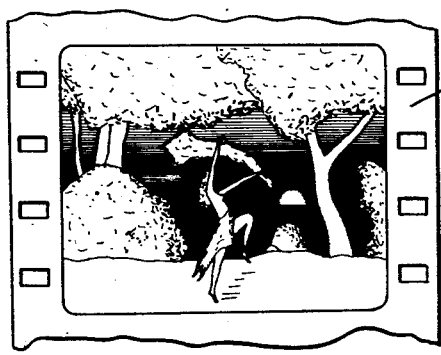
INVENTOR
MAX HANDSCHIEGL
By
ATTORNEY

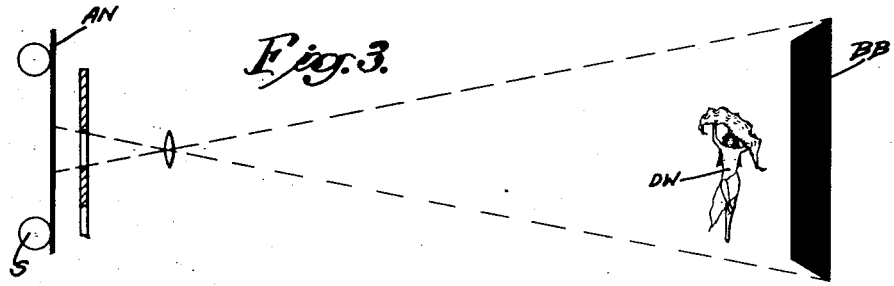
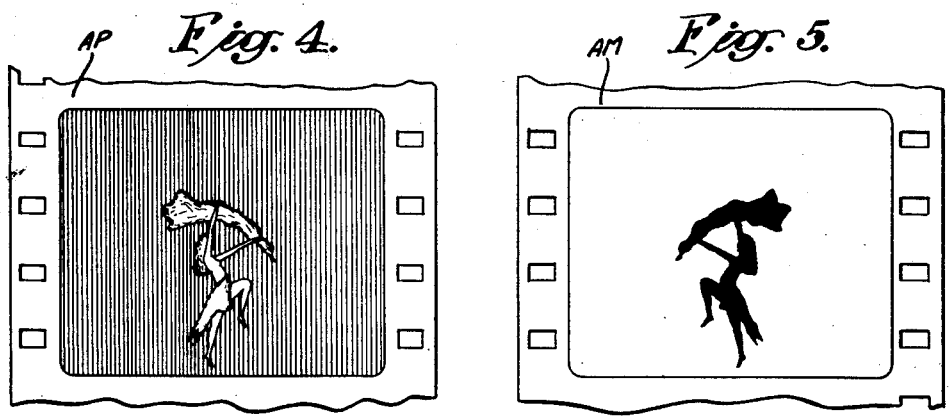
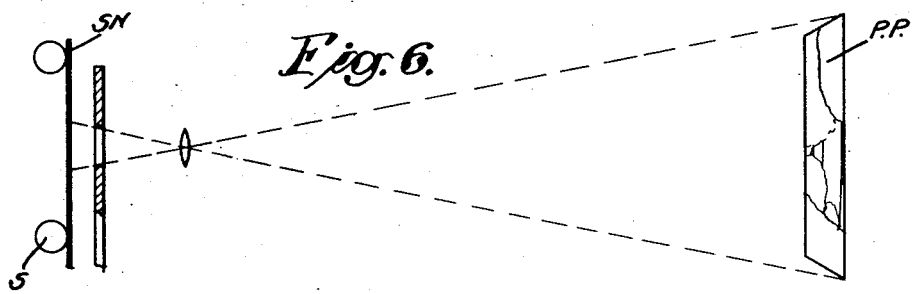
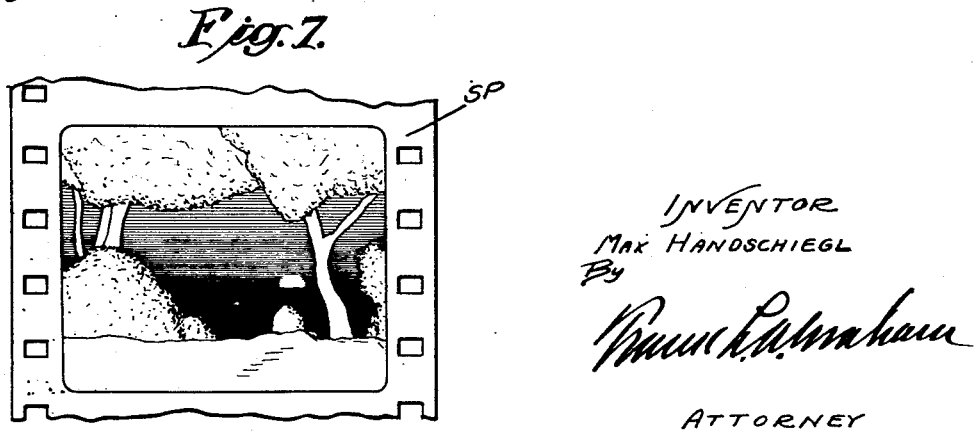

Patented Feb. 28, 1933

1,899,032

UNITED STATES PATENT OFFICE

MAX HANDSCHIEGL, OF LOS ANGELES, CALIFORNIA, ASSIGNOR TO BESSIE HANDSCHIEGL, OF LOS ANGELES, CALIFORNIA

PRODUCTION OF PEDIGREED NEGATIVES

Application filed December 27, 1926. Serial No. 157,129.

It is an object of my present invention to provide means and methods favorable to the production of "trick" or "pedigreed" or so-called "dupe" motion picture or other negatives by a single exposure of a final negative film: but it should be understood that the principles of my invention are applicable also to the direct production of a "trick" positive, by a single exposure of a similarly sensitized film; and it is an important feature of this invention that it enables an "action" or "actions", "shot" at one or more times and/or places, to be combined with an unvarying or varying scene or back-ground, which may be "shot" at any other time and/or place, provision being optionally made not only to mat out exactly those back-ground areas which correspond with images displaying said action or actions but also to procure exact registration, exact focusing and/or controllable proportioning of the illumination of sets of images provided respectively by a back-ground or scenic print and by a foreground or action print, the mentioned sets of images being preferably respectively projected, along substantially identical optical axes, simultaneously upon a final negative or other sensitized film.

It is an object of this invention to provide means and methods in which a so-called "half mirror" or other transparent and partially reflecting body serves, by reflecting one set of images (as, "action" images) and by transmitting another set of images (as, "scenery" images) to throw said images together, but without apparent over-lapping, upon a sensitized film; and over-lapping of the mentioned images may be obviated, in the practice of this invention, by the use of right-to-left reversed mat images, on an additional film, corresponding to the action film and disposed in front of or back of the scenery film, at least three of said films being, in the production of a motion picture negative or positive, advanced in accurate synchronization.

Other objects of my invention, including the provision of suitable apparatus for positioning and advancing the presupposed films (an action film and a scenery film) relatively to said "half-mirror" or semi-transparent mirror, or its equivalent, said apparatus being preferably provided with separately controllable sources of illumination for the projection of images toward the respective faces of said mirror, and therefrom, along a single optical axis, toward a sensitized film, may be best appreciated from the following description of an illustrative embodiment of my invention (alternative details being suggested therein) taken in connection with the appended claims and the accompanying drawings, in which Fig. 1 is a diagrammatic view showing the principles relied upon in what I may refer to as a critical step of my invention, in one embodiment thereof.

Fig. 2 is a diagrammatic view showing one type of apparatus suitable for use in the practice of the critical step illustrated in Fig. 1.

Fig. 3 is a diagrammatic view intended to represent the "shooting" of an action or fore-ground in front of a black, colored or other non-actinic background, or the like, this being one of the preliminary steps which ordinarily precede the execution of the critical step referred to as illustrated in Fig. 1.

Fig. 4 represents a single "frame" from a print produced by the use of a negative such as may result from the development and fixation of a negative obtained somewhat as suggested in Fig. 3.

Fig. 5 represents a corresponding single frame of a mat such as may be produced by intensification of said negative, or by other means, this mat being so disposed, in use, as to produce a right-to-left symmetry, with reference to the mentioned print, the mentioned half-mirror constituting a plane of symmetry or approximate symmetry.

Fig. 6 is a view corresponding to Fig. 3 but intended to represent the "shooting" of any desired picture or scene to be used in providing the background of a final "trick" negative or print.

Fig. 7 is a view comparable with Fig. 4 but intended to show a single "frame" from a background positive or print film such as may be obtained from the negative produced from the sensitized film whose exposure is illustrated in Fig. 6.

Fig. 8 is intended to illustrate a single frame from a final positive obtainable from a "trick" negative such as may result from the use of methods and means illustrated in preceding figures.

Referring to details of that specific embodiment of my invention chosen for purposes of illustration, HM being a half-mirror or other semi-transparent mirror (such as may be obtained by a suitably controlled electro-deposition of platinum upon glass, in a known manner) I show an action positive AP as disposed at an angle, such as an angle of 45°, relatively thereto, in such manner that light rays from a source LS, passing from said action film, may be projected upon what I herein term the front side of said half mirror, or its equivalent, and transmitted therethrough. And I show a scenery positive film SP so disposed relatively to said half mirror (as, at an angle of 45° relatively thereto) that rays from a second light source LS' are projected therefrom, and, striking what I may refer to as the rear surface of said half mirror, or its equivalent, are transmitted therethrough.

Images reflected from the front surface and images resulting from the mentioned transmission are thus alike projected, along convergent or substantially identical axes, or along a common optical axis OA (shown as at right angles to the optical axis OA', of a light beam coming from the action positive, and as parallel with the optical axis O'A of a light beam coming from the scenic positive), both sets of images being simultaneously impressed, with any suitable precautions to avoid confusion by overlapping, upon a final negative FN, shown as disposed in a plane perpendicular to the optical axis OA.

In order to provide an action positive devoid of background, the "shooting" of the desired action may take place, as suggested in Fig. 3 (disclosing a dancing wood nymph DW) in front of a non-actinic back BB, such as a curtain of black velvet or the like; and, after developing and fixing an action negative AN produced in this or an equivalent manner, and before or after the producton of the action print AP therefrom, I may produce a corresponding action mat AM, sustaining, in use, such relationship to the action print AP as will be appreciated upon comparison of Figs. 1, 4 and 5.

It would be understood to be unimportant whether this action mat be produced by printing or by intensification of the negative AN, or by other means; and, although I suggest, in Fig. 6, the "shooting" of a mere painted picture PP to provide a scenic negative SN, from which to produce the scenery positive SP, it should be understood that the methods by which the respective positives and a mat for use therewith are produced is compara- tively immaterial; but my preferred method of preventing a confusion of images upon a final negative FN, or its equivalent, consists in the interposition of the action mat AM in the path of those light rays (produced by a source such as LS') which advance from the scenery positive SP, or its equivalent, toward the rear surface of the half mirror HM, or its equivalent.

It will be obvious that (even though the scenery positive SP, in case this is taken from a picture rather than from a varying scene, may remain stationary) in case the principles of my invention are applied in the production of motion picture film, or the like, the remaining mentioned films must advance intermittently and in perfect synchronization; and that a print FP (Fig. 8) produced from the final negative FN may, if desired, be subsequently used as a scenery negative, disposed in front or back of any new action mat, related in the indicated manner to a new action positive, for the production of a still more sophisticated or highly-pedigreed negative; and it should be appreciated also that, instead of using positives in front of the respective light sources LS and LS', in case a "trick" positive is to be directly produced by means and methods of the general character described, any action negative and a scenery negative being respectively employed in place of the action positive AP and the scenery positive SP, a positive corresponding to the action negative may be used in place of the action mat AM, or its equivalent.

Although I herein place special emphasis upon the process features of my present invention, in order to bring out the advantages which this invention offers in the control of registry, in focusing, and in the proportioning of illumination (without disputing that the exposure of a final negative or positive film to light from an action film and to light from a scenery film may be either simultaneous or sequential) I suggest, in Fig. 2, a form of apparatus which is suitable for use in the execution of the critical step which is diagrammatically illustrated in Fig. 1.

In Fig. 2, 11 being a light-tight box in which the half-mirror or other semi-transparent mirror HM may be diagonally disposed, I show at 12AP a housing for reels adapted to manipulate the action positive AP, or its equivalent. I show at 13AM a housing for rolls and mechanism adapted to manipulate the action mat AM, or its equivalent; I show at 14FN a housing for rolls and mechanism adapted to manipulate the final negative FN, or its equivalent; and I show at 15SP a housing for rolls which may carry a scenic positive, capable of being advanced by the same mechanism, sprockets S being in all these cases of substantially identical character, and synchronization in the advance of the films AP, AM, and FN, or their equivalents, being effected by means such as the interconnection of shafts 16, 17 and 18. The latter may be rotatable, through a handle 19, by means such as intermeshing gears 20, 21; and, to provide for relative adjustment of the optical axis OA' or O'A (in order to assure registry of images and matting shadows, with due allowance for a refractive effect suggested by the off-setting of the axis OA relatively to the axis O'A) I may provide, in connection with one or two or all of the described roll housings and associated mechanisms, screw means such as are diagrammatically suggested at 22 and 23; and, whatever the nature of the lens or lenses (not shown) used in connection with the described projecting means, I may employ, in connection therewith, adjusting or focusing means of any usual or preferred character, controlling the same (if internal to the box 11) by means such as adjusting screws 24, 24', shown as having external milled heads, or by means such as rotatable sections or collars 25, 25'.

To provide for a suitable intensity and proportioning of illumination, I may either provide means for varying an aperture (as, by rotation of milled collars 25, 25', manipulating iris diagrams, or the like, not shown) or I may provide for the interposition of variable resistances such as are suggested at 27, 27', into a circuit or circuits by which incandescent or other lights are energized; or I may incorporate both mechanical and electrical control means for alternative or additive uses; and, I particularly point out that, although my use of a mat film permits novel and exceedingly diverting or puzzling "trick" effects to be produced, the indicated provisions for separate focusing, for separate lateral adjustment in either of two planes, and for accurate proportioning of the illumination given to any two films whose images are to be combined, all cooperate in rendering the use of my described apparatus and method highly advantageous, even in case the projected images (whether obtained by transmitting light through or reflecting light from the image-carrying films) are not over-lapping in their relationships, as thrown intermittently on a film; and a capped sight opening may be provided, as at SO, to provide guidance in effecting any or all of the mentioned adjustments.

Although I have herein described a single complete embodiment of my invention, suggesting various alternative details, it should be understood not only that various features of my invention are capable of independent use, but also that numerous modifications, additional to those specifically suggested herein, might easily be devised by workers in the arts to which this case relates, without involving the slightest departure from the spirit and scope of this invention, as the same is indicated above and in the following claims.

I claim as my invention:

1. The method of producing a composite photograph, that includes making positive and negative images of one component with complementary opaqued parts, and thus forming complementary silhouettes of said component, and projecting simultaneously and in register onto a fresh actinic surface an optical image of one of said silhouette images and an optical image of the other component masked by the other silhouette image.

2. The method of producing a composite photograph, that includes forming two images of one component with complementary opaqued parts, and thus forming complementary silhouettes of said component, and projecting simultaneously and in register onto a fresh actinic surface an optical image of one of said silhouette images and an optical image of the other component masked by the other silhouette image.

3. The method of producing a composite photograph, that includes making an image of one component, making two images of the other component with complementary opaqued parts and thus forming complementary silhouettes of said component, masking the image of the first mentioned component with one of said silhouettes, and projecting simultaneously and in register onto a fresh actinic surface an optical image of the other silhouette of the second mentioned component and an optical image of the first mentioned component so masked by the first mentioned silhouette of the second mentioned component.

In testimony whereof, I have hereunto set my hand at Los Angeles, California, this 10th day of December 1926.

MAX HANDSCHIEGL.